United States Patent
Shi et al.

(10) Patent No.: US 6,996,403 B2
(45) Date of Patent: Feb. 7, 2006

(54) METHOD AND APPARATUS FOR LOCATING A REMOTE UNIT

(75) Inventors: Qicai Shi, Coral Springs, FL (US); Neiyer S. Correal, Cooper City, FL (US); Jian Huang, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/001,797

(22) Filed: Dec. 2, 2004

(65) Prior Publication Data

US 2005/0135319 A1 Jun. 23, 2005

Related U.S. Application Data

(60) Provisional application No. 60/531,453, filed on Dec. 19, 2003.

(51) Int. Cl.
*H04Q 7/20* (2006.01)
(52) U.S. Cl. .................... 455/456.1; 455/41.2
(58) Field of Classification Search ..... 455/456.1–457, 455/402.2, 461, 41.1–41.3, 11.1, 13.2, 502, 455/454, 517, 423; 342/457, 450, 453, 463
See application file for complete search history.

(56) References Cited

U.S. PATENT DOCUMENTS

| | | | | |
|---|---|---|---|---|
| 6,728,545 | B1 * | 4/2004 | Belcea | 455/456.2 |
| 2004/0005899 | A1 * | 1/2004 | Nir et al. | 455/456.1 |
| 2005/0064878 | A1 * | 3/2005 | O'Meagher | 455/456.1 |

OTHER PUBLICATIONS

Levanon, N. "Lowest GDOP in 2-D Scenario" IEEE Jun. 2000, vol. 147 No. 3.

* cited by examiner

*Primary Examiner*—Elseo Ramos-Feliciano

(57) ABSTRACT

A method and apparatus for locating a remote unit (or node) is provided herein. During operation, location-finding equipment (106) will determine a gross location of non-located nodes (104) by determining distances of the nodes (104) to reference nodes (105). Additionally an error estimate in the location for each node is determined. A first subset of nodes having relatively lower error estimates are "promoted" to reference nodes, and a second subset of nodes having higher error estimates are again located based on a distance to the newly-promoted reference nodes.

19 Claims, 4 Drawing Sheets

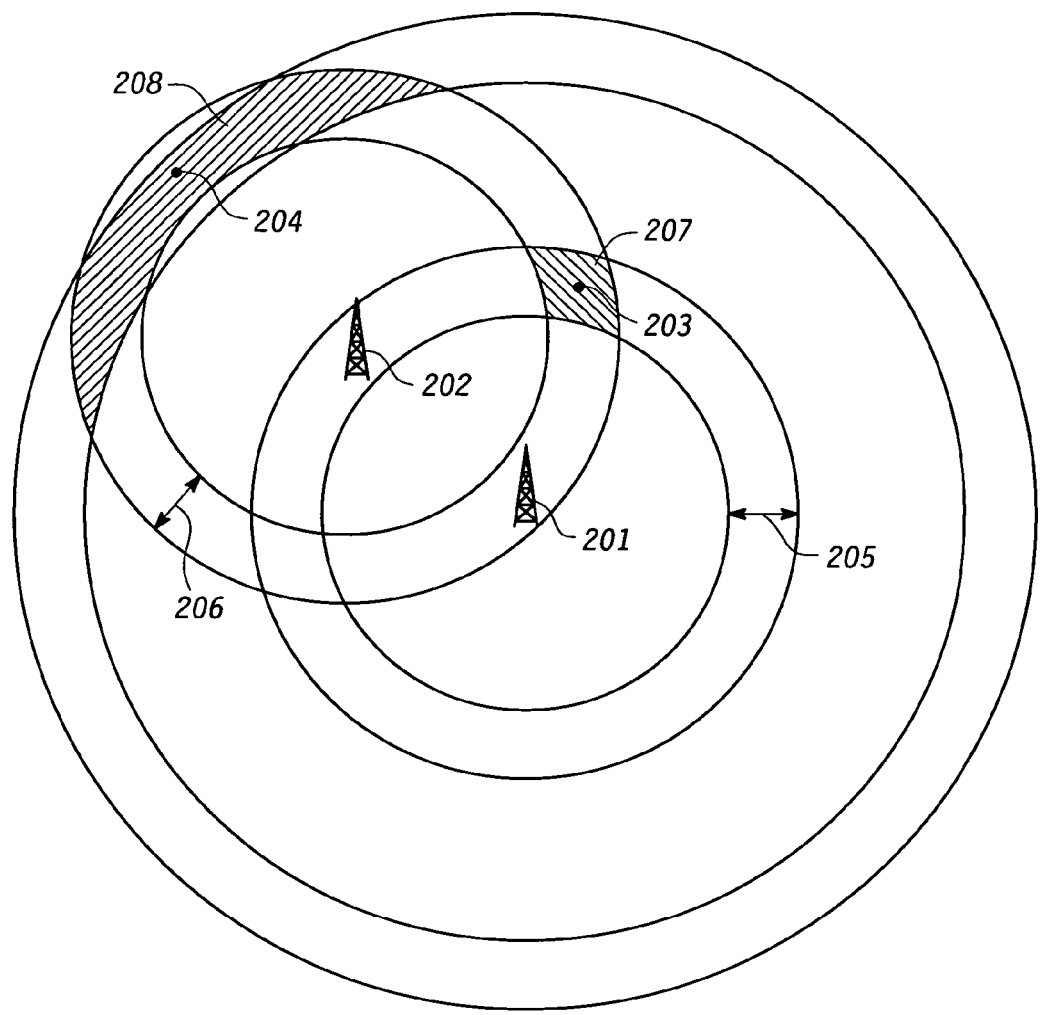
FIG. 2
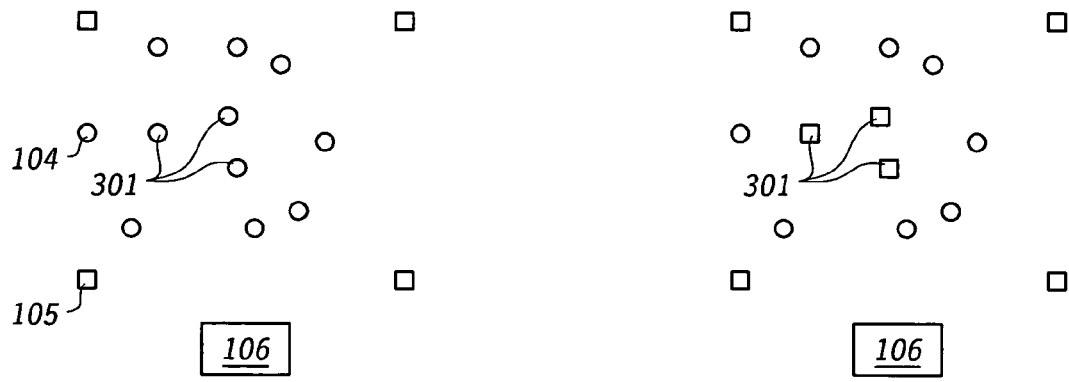
FIG. 3  FIG. 4

METHOD AND APPARATUS FOR LOCATING A REMOTE UNIT

FIELD OF THE INVENTION

The present invention relates generally to location and in particular, to a method and apparatus for locating a remote unit.

BACKGROUND OF THE INVENTION

A variety of systems have been proposed which call for the ability to locate an object. For example, in asset control, it would be desirable to locate objects (e.g., laptop computers) within the confines of an office building. It is also desirable to be able to locate a cellular phone user for emergency service purposes.

The Global Positioning System (GPS) is an example of a prior art system for determining the location of an object. While GPS can be extremely accurate in performing location, a disadvantage of GPS is that in urban canyons or within buildings, signals from GPS satellites may be occluded. Additionally, GPS location circuitry can be space consuming and expensive.

One approach taken to address this issue is to use a group of receivers at fixed locations to locate objects containing transmitters. The fixed receivers are connected to a central computer that serves to determine the location of each object based on signals received from one or more of the group of receivers. While this technique is fairly cheap and easy to implement, it can be very computationally complex and does not provide a very accurate location estimate when compared to other location techniques. As is evident, there exists a tradeoff between accurate location techniques that are expensive to implement, and less expensive techniques that are less accurate. It would be beneficial, therefore, to improve on the less-expensive approach described above so that a more accurate/less complex determination of location can be made. Any such technique employed should also be capable of operating in ad-hoc networks, where nodes may be separated by more than one "hop". Therefore a need exists for a method and apparatus for locating a device that is relatively inexpensive yet, provides accurate location estimates.

BRIEF DESCRIPTION OF THE DRAWINGS

FIG. 2 illustrates how the actual location of a node influences an error in determining an estimated location for the node.

FIG. 3 and FIG. 4 illustrate the location of nodes within a system.

DETAILED DESCRIPTION OF THE DRAWINGS

In order to address the above-mentioned need, a method and apparatus for locating a remote unit (or node) is provided herein. During operation, location-finding equipment will determine a gross location of non-located nodes by determining distances of the nodes to reference nodes. Additionally an error estimate in the location for each node is determined. A first subset of nodes having relatively lower error estimates are "promoted" to reference nodes, and a second subset of nodes having higher error estimates are again located based on a distance to the newly-promoted reference nodes.

The present invention encompasses a method for locating a remote unit. The method comprises the steps of determining location estimates for a plurality of nodes, determining errors in the location estimates, and determining a first and a second subset of nodes based on the errors in the location estimates. The first subset of nodes comprises those nodes with lower error values in the location estimates and the second subset of nodes comprises those nodes with higher error values in the location estimates. Finally, the second subset of nodes is relocated by utilizing the first subset of nodes.

The present invention additionally encompasses method for locating a remote unit. The method comprises the steps of determining location estimates for a plurality of nodes by determining distances to reference nodes with known locations. Errors in the location estimates are determined and a first and a second subset of nodes are determined. The first subset of nodes comprises those nodes with lower errors for the location estimates and the second subset of nodes comprises those nodes with higher errors for the location estimates. The first subset of nodes are promoted to reference nodes, and the second subset of nodes are relocated by determining their distances to the reference nodes.

The present invention additionally encompasses location Finding Equipment (LFE) comprising logic circuitry determining location estimates for a plurality of nodes, determining error values for the location estimates, determining a first and a second subset of nodes based on the error values, wherein the first subset of nodes comprises those nodes with lower error values for the location estimates and the second subset of nodes comprises those nodes with higher error values for the location estimates, and relocating the second subset of nodes by utilizing the first subset of nodes.

Figure 1:
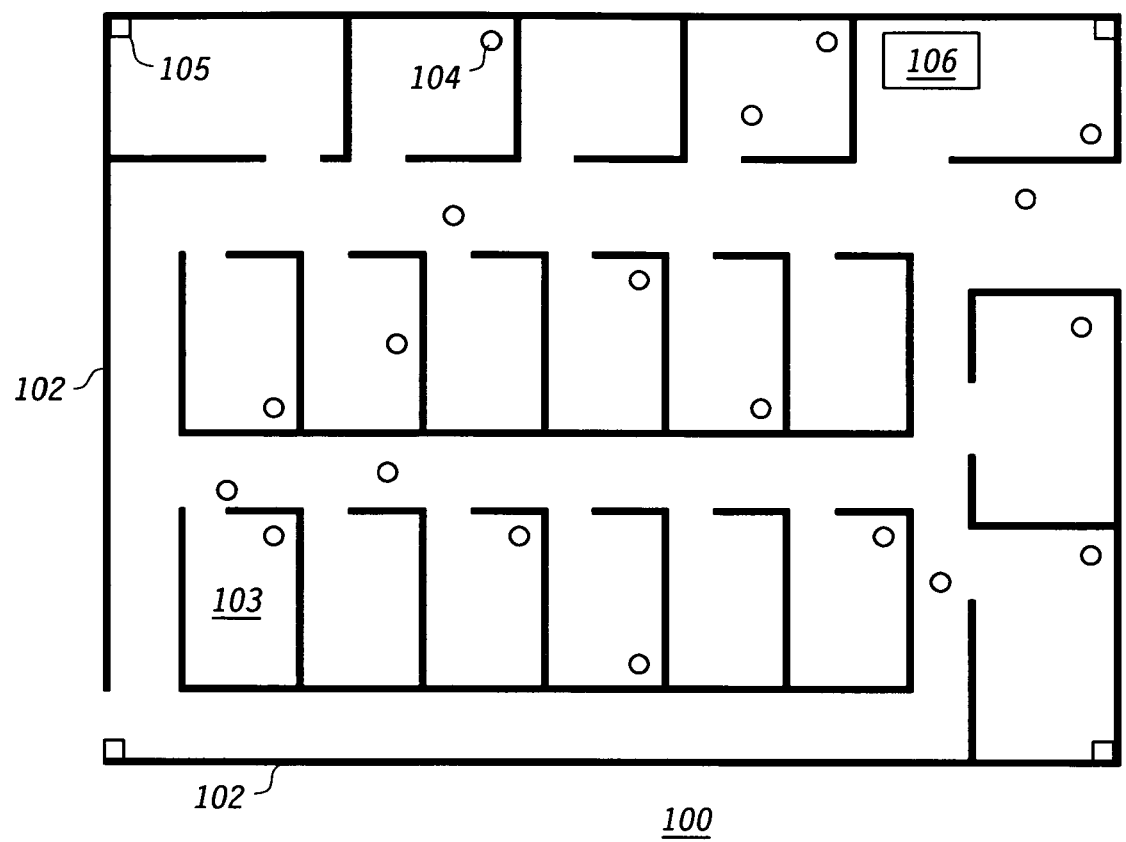
FIG. 1 is illustrates a typical floor plan of an office building in which are located a number of wireless devices involved in determining each other's location.

Turning now to the drawings, wherein like numerals designate like components, FIG. 1 is a floor plan 100 of an interior of an office building, in which are located a number of wireless devices 104 and 105 involved in determining each other's location. Floor plan 100 comprises perimeter wall 102 that encloses a plurality of offices 103 (only one labeled).

Circular objects 104 (only one labeled) shown on floor plan 100 represent wireless devices (remote, or mobile units), the locations of which are unknown and to be determined. Wireless devices 104 can include, for example, transceiver security tags attached to valuable assets such as lap top computers, or wireless communication devices including cellular telephones. Rectangular objects 105 (only one labeled) represent reference devices, or nodes. The locations of devices 105 are known, or can be easily and accurately determined to within some measurement accuracy (e.g., via GPS). Reference devices 105 are utilized in determining the locations of devices 104. A central processing node 106 serves as location-finding equipment (LFE) to perform calculations involved in determining the location of devices 104–105 as will be described below in more detail.

It should be noted that although FIG. 1 shows wireless devices 104–105 existing within a two-dimensional space, one of ordinary skill in the art will recognize that wireless devices 104–105 may be located in other environments, including 3-dimensional spaces. For example, wireless devices 104 may comprise golf carts equipped with wireless transceivers located on a golf course. In a similar manner, wireless devices 104 may comprise inventory located within a warehouse. Irrespective of the environment where wireless devices 104 operate, reference nodes 105 are dispersed in known locations to aide in locating devices 104. Additionally, FIG. 1 shows LFE 106 existing independent of reference nodes 105, however, one of ordinary skill in the art will recognize that reference nodes 105 may comprise the necessary circuitry to perform the location estimation described below.

As described above, a variety of systems have been proposed for locating wireless devices 104. A problem exists in that accurate location of devices 104 requires, expensive circuitry. In order to address this issue, a location technique is utilized that uses located devices 105 to locate devices 104. In order to improve on prior-art location techniques, a subset of devices 104 is first located, and then utilized in locating the remainder devices 104. The subset of devices are chosen to have the lowest error in any location estimate, and once located, the subset of devices are utilized to locate the remainder of un-located devices.

Prior to describing any location technique, the following text sets forth necessary background information for proper understanding of the techniques utilized in locating devices in accordance with the preferred embodiment of the present invention.

FIG. 2 illustrates how the actual location of a node influences an error in determining an estimated location for the node. In particular, FIG. 2 illustrates two reference nodes 201 and 202 attempting to locate two nodes 203 and 204. During location, each reference node 201 and 202 attempts to determine a distance from itself to the particular node being located. Each reference node 201 will be able to determine this distance (or range) to nodes 203 and 204 to within a certain accuracy. More particularly, each range determination will have an associated error 205 and 206 (not necessarily equal). Thus, for reference node 201, any range estimate will comprise an associated error 205, and for reference node 202, any range estimate will comprise an associated error 206. In principle, since any location estimate will be based on an intersection of range estimates, each location will have an associated error that is based on the combined errors of each reference node. Thus, the location of node 203 will have an error bounded by region 207, while the location of node 204 will have an error bounded by region 208.

As is evident, the error associated with the location of node 203 is much smaller than the error associated with the location of node 204. Therefore, by using a location technique that locates devices having the lowest error in any location estimate, and then using these devices to locate other non-located devices, the overall error in locating nodes 104 can be minimized.

As shown, FIG. 3 comprises a plurality of devices 104, the locations of which are unknown. FIG. 3 additionally comprises a plurality of reference devices 105, the locations of which are known. Finally, FIG. 3 comprises LFE 106. As discussed above, LFE 106 performs the necessary calculations to locate devices 104. It is assumed that the devices 104–106 of FIG. 3 are within communication range of each other.

During operation, devices 104 and 105 provide LFE 106 with a range estimates to neighboring devices. The range estimates may be determined by simply analyzing a signal strength (e.g., received signal strength indication (RSSI)) of the neighbor's transmission, as described by Patwari et al. in U.S. Pat. No. 6,473,038 METHOD AND APPARATUS FOR LOCATION ESTIMATION, or may be determined by determining a propagation delay of signals transmitted between neighboring nodes. Propagation delays between nodes 104–105 will be directly proportional to distances between nodes 104–105. Regardless of the technique used to determine distances between nodes 104–105, nodes 104–105 pass signal strength, or propagation information to LFE 106 which then accurately determines the location of nodes 104.

During location, LFE 106 first determines a gross location for all devices 104 by analyzing the range estimates provided by nodes 104–105. In the preferred embodiment of the present invention, a geometric based location algorithm is utilized in determining the gross location of devices 104. In particular, when the distances $x_1$ and $x_2$ between a node 104 and a pair of reference nodes 105 are known, the position of node 104 may be computed by determining the point of intersection of two circles with radii $x_1$ and $x_2$, each centered at one of the fixed base stations. A third reference node 105 is typically needed to unambiguously locate each node 104 at the unique point of intersection of the three circles. To accurately compute location using this method, it is necessary for LFE 106 to know the instant a signal is emitted from reference nodes 105 and the instant it arrives at the node 104 to be located. For this method to work properly, an accurate measurement of the total time delay along each of the three node-to-reference node signal paths is necessary.

Once gross location for all devices 104 are determined, a more accurate determination of location is then made for nodes 104. More particularly, a subset of devices 104, having a most favorable predicted error in any location estimate is then located. While there exists many techniques in determining a predicted error in any location estimate, in the preferred embodiment of the present invention the predicted error in location is based on a Geometric Dilution of Precision (GDOP). More particularly, a GDOP is determined for each grossly-located node 104, and nodes 104 with the best GDOP are then more-accurately located. The determination of GDOP values for each node 104 is known in the art, and described by N. Levanon in "Lowest GDOP in 2-D Scenarios", pages 149–155, IEE Proc.-Radar, Sonar Navig., Vol. 147, No. 3, June 2000.

Once the location of the subset of devices 104 is determined, the subset of devices 104 then become "promoted" to reference devices 105, and a new iteration that uses the augmented set of reference devices (promoted reference devices and old reference devices) selects a new subset of non-located devices 104 having a favorable GDOP, and the process continues progressively promoting nodes and computing new distances until LFE 106 determines the location of all non-located devices 104. This process is illustrated in FIG. 3 and FIG. 4. As shown in FIG. 3, non-located devices 301 have been chosen to be located since their location results in the most favorable GDOP. Devices 301 are then located (FIG. 4), and are utilized in locating other non-located devices 104.

Figure 5:
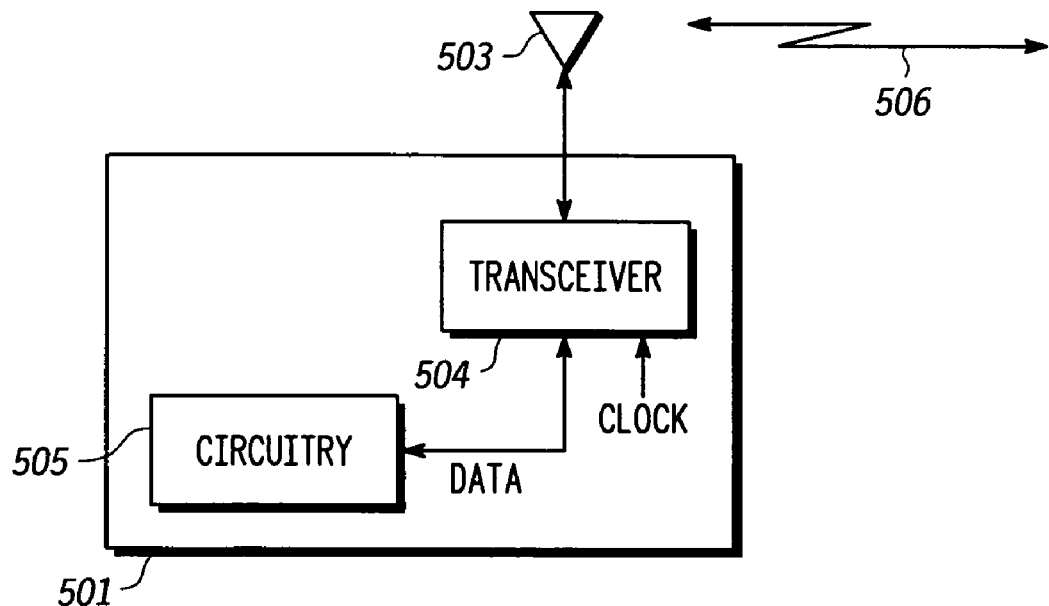
FIG. 5 is a block diagram of a node equipped to determine a distance to other neighboring nodes.

FIG. 5 is a block diagram of node 501 equipped to determine a distance to other neighboring nodes and provide the "range estimate" to LFE 106. Node 501 can be either a reference node, or alternatively can be a non-located node. Regardless of the form node 501 takes, node 501 is equipped with antenna 503, transceiver 504, and range circuitry 505. When node 501 wishes to determine a range to other nodes, node 501 transmits over-the-air signal 506 to other neighboring nodes, and similarly receives over-the-air communication signal 506 transmitted from other neighboring nodes. Once received by transceiver 504, over-the air signal 506 is time-stamped via an internal clock, and data regarding the reception time and transmit time of signal 506 is passed to circuitry 505.

If circuitry 505 is utilizing a signal-strength technique to determine range information, circuitry 505 determines a range to a particular node based on the RSSI and passes this information (via transceiver 504) to LFE 106. In a similar manner, if circuitry 505 is utilizing a time-of-arrival technique to determine range information, circuitry 505 determines a range from a propagation delay of signals transmitted between neighboring nodes, and passes the range information to LFE 106.

Figure 6:
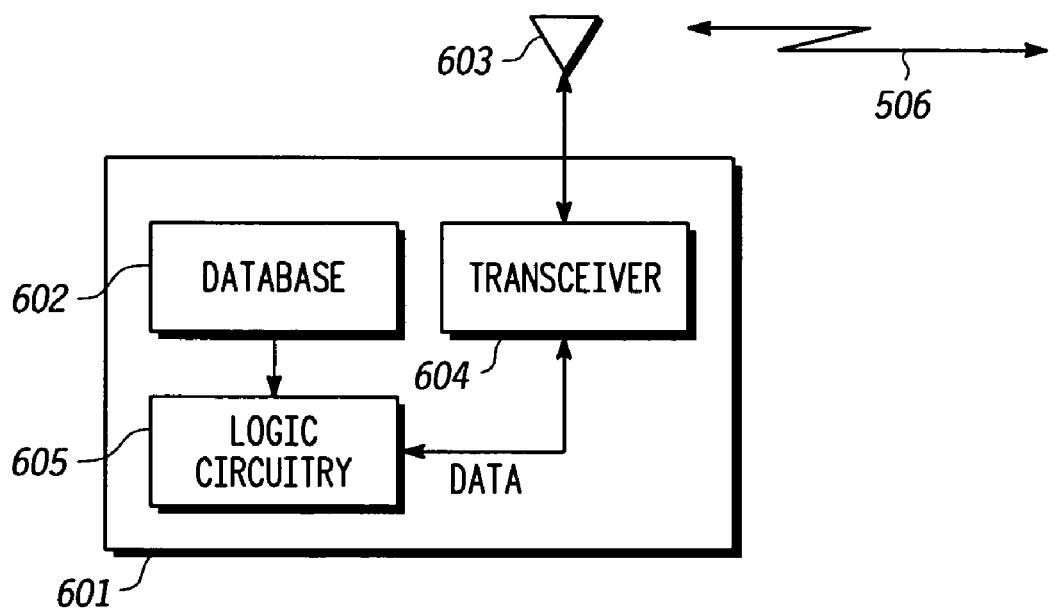
FIG. 6 is a block diagram of location-finding equipment of FIG. 1.

FIG. 6 is a block diagram of LFE 106. During operation, transceiver 604 receives over-the-air communication signal 506 from nodes 104 and 105. Logic circuitry 605 analyzes the received data to determine range information. This information is then stored in database 602. Thus, database 602 comprises range information for all nodes 104, 105 to their neighboring nodes. Logic circuitry 605, then utilizes this information, as discussed above to grossly, and accurately determine the location of each node 104. This is accomplished as shown in FIG. 7.

Figure 7:
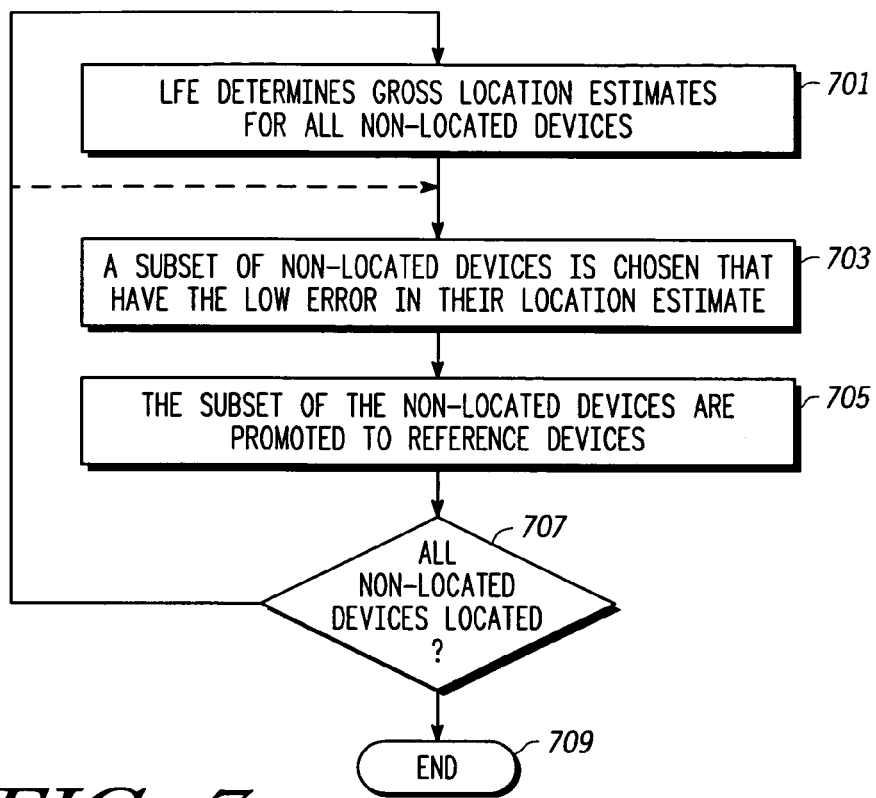
FIG. 7 is a flow chart showing the operation of LFE 106.

FIG. 7 is a flow chart showing the operation of LFE 106. The logic flow begins at step 701 where logic circuitry 505 determines gross location estimates for all non-located devices 104 (plurality of nodes). As discussed above, a geometric-based location algorithm is utilized in determining gross location estimates based on the range estimates provided by nodes 104–105. In particular, the step of determining gross location estimates for the plurality of nodes comprises the steps of determining distances from the plurality of nodes to reference nodes having known locations and utilizing a geometric location technique to locate the plurality of nodes based on their distances to the reference nodes.

Once gross location of devices 104 is known, a subset of devices 104 is chosen based on an estimated error in their gross location (step 703). In particular, at step 703 an error in gross location is determined for each device 104, and a subset of devices 104 is chosen that contains those devices 104 with the lowest error in their gross location estimates. Thus, at step 703, a first subset of nodes comprise those nodes with lower error values in their location estimates, while a second subset of nodes comprises those nodes with higher error values in their location estimates. Although several techniques may be utilized in determining the subset of devices that will minimize the overall error in locating the remainder of devices 104, in the preferred embodiment of the present invention, a subset of devices 104 is chosen that will result in a most favorable GDOP.

The logic flow continues to step 705 where the first subset of devices 104 are promoted to reference devices 105, and the logic flow continues to step 707 where it is determined if all non-located devices 104 have been located. If not, the logic flow returns to step 701 (or alternatively to step 703), with previously located devices are now categorized as located, or reference device. In other words, by returning to step 701 those nodes with higher error values (second subset of nodes) are again located based on their distances to reference nodes 105, but this time, the location may utilize the recently-promoted reference nodes. By grossly locating non-located devices 104, and then utilizing a subset of the grossly-located devices in determining the location of other non-located devices, a more accurate location technique is realized.

Figure 8:
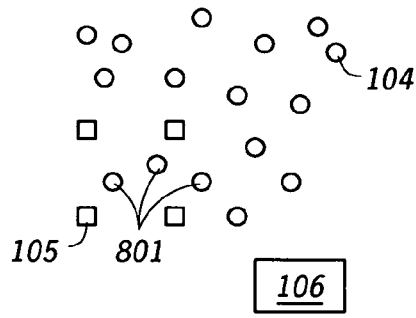
FIG. 8 through FIG. 10 illustrates location of nodes within a multi-hop communication system.

Although the above example was given where all devices 104–106 were in transmission range of each other, this does not necessarily need to be the case. For example, the above techniques can be used in a multi-hop network, where nodes are not necessarily within each other's range. In such a scenario, reference nodes 105 are located sufficiently close such that they can communicate with each other and other non-located devices 104. This is illustrated in FIG. 8. As is evident, reference nodes 105 (only one labeled) are located sufficiently close when compared to non-located nodes 104 (only one labeled). Similar to the technique described above, a relative locative algorithm is used to estimate gross locations of devices 104 that are within the communication range of reference devices 105. A subset of these devices (chosen as those units with the lowest error in their estimated locations) is then promoted to reference devices used to more-accurately locate other grossly-located devices. In particular, as discussed above, reference devices 105 analyze signals transmitted from non-reference devices 104 in order to geometrically locate non-reference devices 104. All located devices then become reference devices 105 for the purposes of located other non-located devices 104. The process continues until all non-located nodes are promoted to reference nodes.

Figure 9:
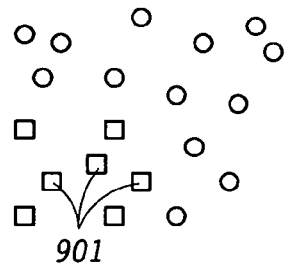
Figure 10:
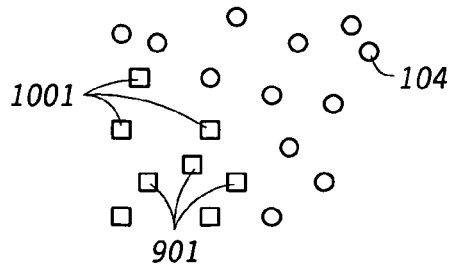

The above technique is illustrated in FIGS. 8, 9, and 10. As is evident, during the first iteration, nodes 801 of FIG. 8 have been "promoted" to reference nodes 901 in FIG. 9. Nodes 901 will aide in locating an additional subset of non-located nodes 104. In the next iteration, nodes 1001 have been "promoted" to reference nodes. The cycle continues until all nodes have been located, or "promoted". It should be noted that in addition to utilizing a subset of nodes having the lowest predicted errors in their locations, the subset of nodes can also be picked in order to propagate the location of nodes in a certain direction. For example, if nodes in a certain area are desired to be located, reference nodes can be added to the system that lie in the direction of the area. As more and more iterations are completed, the desired area is covered.

It should be noted that in a highly-populated network, additional steps are taken in order to reduce computational complexity. In particular, because many nodes may be promoted to reference nodes 105, it may be necessary to utilize a subset of reference nodes 105 during the location of nodes 104. The location procedure is similar to that described above with an additional step added specifically for a highly populated network. In particular, a reference node selection procedure performed along with the iteration procedure. Thus, for a highly populated network, a subset of reference nodes 105 are chosen to perform location estimates for nodes 104.

While the invention has been particularly shown and described with reference to a particular embodiment, it will be understood by those skilled in the art that various changes in form and details may be made therein without departing from the spirit and scope of the invention. For example, It is intended that such changes come within the scope of the following claims.

What is claimed is:

1. A method for locating a remote unit, the method comprising the steps of:
determining location estimates for a plurality of nodes;
determining errors in the location estimates;

determining a first and a second subset of nodes based on the errors in the location estimates, wherein the first subset of nodes comprises those nodes with lower error values in the location estimates and the second subset of nodes comprises those nodes with higher error values in the location estimates; and relocating the second subset of nodes by utilizing the first subset of nodes.

2. The method of claim 1 wherein the step of determining location estimates for the plurality of nodes comprises the step of determining location estimates for the plurality of nodes via a geometric location technique.

3. The method of claim 2 wherein the step of determining the location estimates for the plurality of nodes comprises the steps of:

determining distances from the plurality of nodes to reference nodes having known locations; and utilizing a geometric location technique to locate the plurality of nodes based on their distances to the reference nodes.

4. The method of claim 2 wherein the step of determining the location estimates for the plurality of nodes comprises the steps of:

determining distances from the plurality of nodes to a subset of reference nodes having known locations, wherein the subset of reference nodes are chosen to reduce computational complexity; and utilizing a geometric location technique to locate the plurality of nodes based on their distances to the subset of reference nodes.

5. The method of claim 1 wherein the step of determining errors in the location estimates comprises the step of determining a Geometric Dilution of Precision (GDOP) for the location estimates.

6. The method of claim 1 wherein the step of relocating the second subset of nodes comprises the steps of:

promoting nodes within the first subset of nodes to reference nodes having known locations;

determining distances from nodes within the second subset of nodes to the reference nodes; and utilizing the geometric location technique to locate the second subset of nodes based on their distances to the reference nodes.

7. The method of claim 1 wherein the step of relocating the second subset of nodes comprises the steps of:

promoting nodes within the first subset of nodes to reference nodes having known locations;

determining distances from nodes within the second subset of nodes to a subset of reference nodes, wherein the subset of reference nodes are chosen to reduce computational complexity; and utilizing the geometric location technique to locate the second subset of nodes based on their distances to the subset of reference nodes.

8. A method for locating a remote unit, the method comprising the steps of:

determining location estimates for a plurality of nodes by determining distances to reference nodes with known locations;

determining errors in the location estimates;

determining a first and a second subset of nodes, wherein the first subset of nodes comprises those nodes with lower errors for the location estimates and the second subset of nodes comprises those nodes with higher errors for the location estimates;

promoting the first subset of nodes to reference nodes; and relocating the second subset of nodes by determining their distances to the reference nodes.

9. The method of claim 8 wherein the step of determining the location estimates for the plurality of nodes comprises the steps of determining location estimates for the plurality of nodes by determining distances to a subset of reference nodes, wherein the subset of reference nodes is chosen to reduce computational complexity.

10. The method of claim 8 wherein the step of determining errors in the location estimates comprises the step of determining a Geometric Dilution of Precision (GDOP) in the location estimates.

11. The method of claim 8 wherein the step of relocating the second subset of nodes comprises the steps of relocating the second subset of nodes by determining their distances to a subset of reference nodes chosen to reduce computational complexity.

12. Location Finding Equipment (LFE) comprising:

logic circuitry determining location estimates for a plurality of nodes, determining error values for the location estimates, determining a first and a second subset of nodes based on the error values, wherein the first subset of nodes comprises those nodes with lower error values for the location estimates and the second subset of nodes comprises those nodes with higher error values for the location estimates, and relocating the second subset of nodes by utilizing the first subset of nodes; and a database for storing location estimates.

13. The LFE of claim 12 wherein the location estimates for the plurality of nodes are determined via a geometric location technique.

14. The LFE of claim 12 wherein the location estimates for the plurality of nodes are determined via a distance to reference nodes having a known location.

15. The LFE of claim 12 wherein the location estimates for the plurality of nodes are determined via a distance to a subset of reference nodes having a known location, wherein the subset of reference nodes is chosen to reduce computational complexity.

16. The LFE of claim 12 wherein the error values comprise Geometric Dilution of Precision (GDOP) values for the location estimates.

17. The LFE of claim 12 wherein the second subset of nodes is relocated by promoting the first subset of nodes to reference nodes and then determining a distance from the second subset of nodes to the reference nodes.

18. The LFE of claim 12 wherein the second subset of nodes is relocated by promoting the first subset of nodes to reference nodes and then determining a distance from the second subset of nodes to a subset of reference nodes chosen to reduce computational complexity.

19. The LFE of claim 12 wherein the plurality of nodes exist within a multi-hop network.

* * * * *